Sept. 21, 1926. 1,600,543
J. A. HEARD
AUTOMATIC DRINK MIXER
Filed Sept. 21, 1925 2 Sheets-Sheet 1
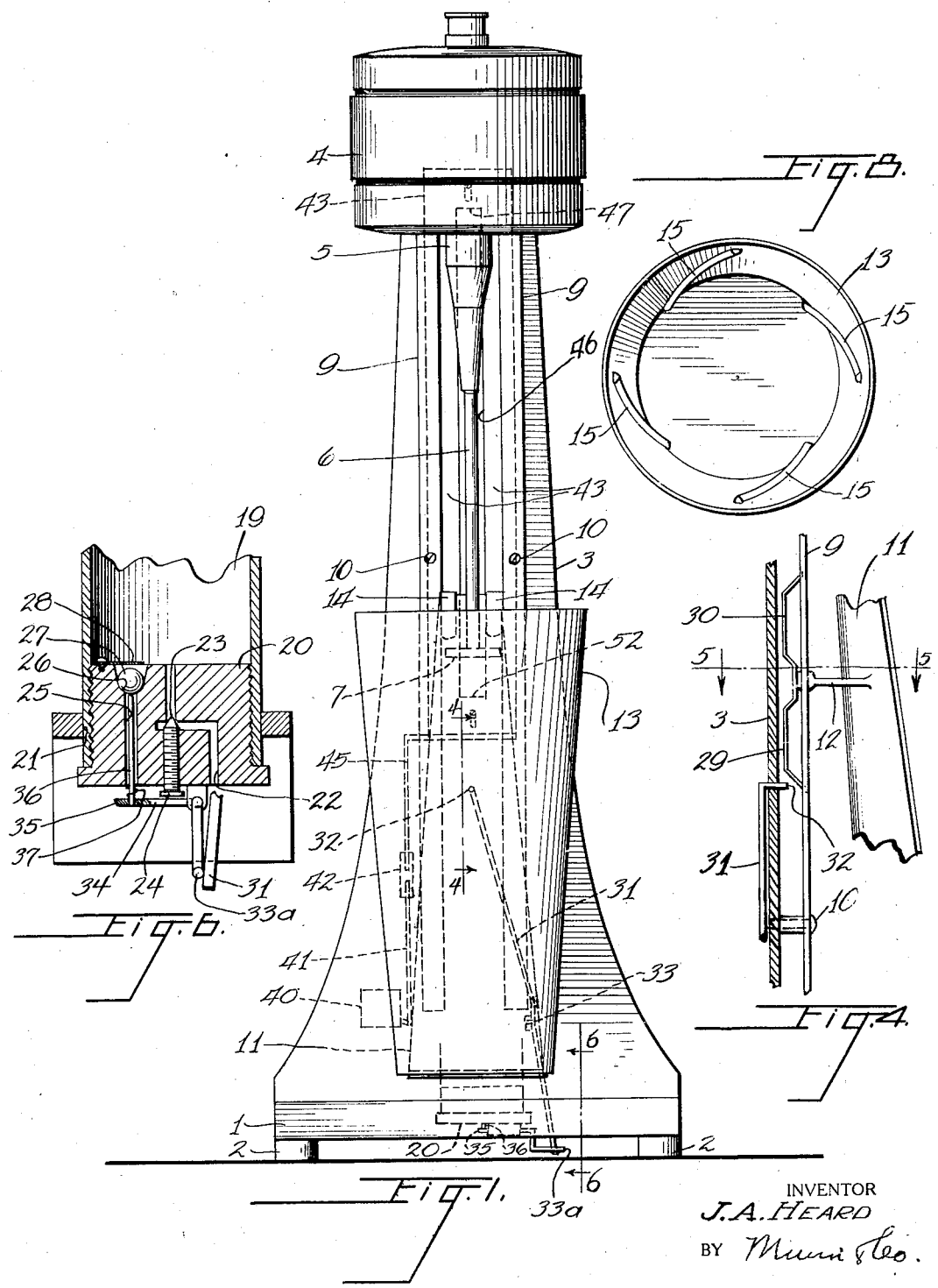
INVENTOR
J. A. HEARD
BY Munn & Co.
ATTORNEYS Sept. 21, 1926.
J. A. HEARD
AUTOMATIC DRINK MIXER
Filed Sept. 21 1925
1,600,543
2 Sheets-Sheet 2
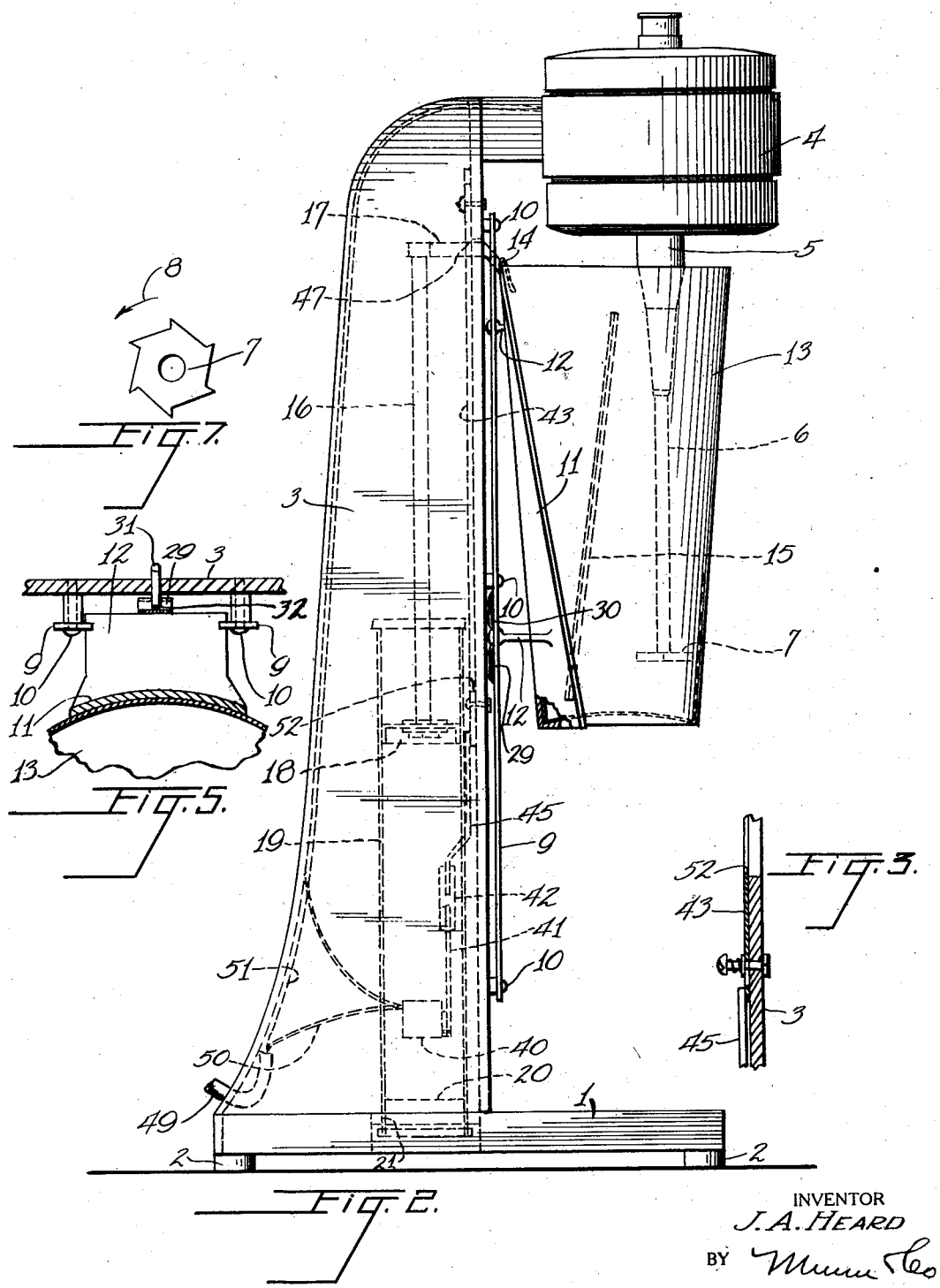
INVENTOR
J. A. HEARD
BY
ATTORNEYS Patented Sept. 21, 1926.

1,600,543

UNITED STATES PATENT OFFICE.

JOHN ALAN HEARD, OF SAN ANTONIO, TEXAS.

AUTOMATIC DRINK MIXER.

Application filed September 21, 1925. Serial No. 57,516.

My invention relates to improvements in automatic drink mixers, and consists in the combinations, constructions, and arrangements herein described and claimed.

An object of my invention is to provide an automatic drink mixer, in which means is provided for automatically starting and stopping the agitator motor when the drink is placed in the device for mixing, and when the mixing has been completed, respectively.

A further object of the invention is to provide a device of the character described, in which means is provided for moving the drink with respect to the agitator during the process of mixing, so that the agitator may operate throughout the entire depth of the mixing cup. Thus there is little possibility of any portion of the drink remaining unaffected by the agitator.

A further object of the invention is to provide a device of the character described, in which means is provided for quickly lowering the receptacle containing the drink as the agitator nears the level of the liquid therein, so as to cause the liquid to fall entirely out of contact with the agitator with sufficient speed so as to prevent the spattering of the liquid by the agitator operating near the surface of the liquid.

A further object of the invention is to provide a device of the character described, which is adaptable for use with the drink-containing receptacle filled to different predetermined levels.

A further object of the invention is to provide a device of the character described, in which the drink-containing receptacle is of novel structure, and in which the agitator is of novel structure, the advantages obtained thereby being a more rapid and thorough mixing of the drink.

A further object of the invention is to provide a device of the character described, in which the time during which the drink is being mixed by the agitator may be regulated. This feature permits the device to be adjusted for drinks of different densities.

Other objects and advantages will appear in the following specification, and the novel features of the invention will be particularly pointed out in the appended claims.

My invention is illustrated in the accompanying drawings, forming part of this application, in which Figure 1 is a front elevation of an embodiment of my invention, Figure 2 is a side elevation of the device illustrated in Figure 1, Figure 3 is a sectional view through a portion of the device, Figure 4 is a sectional view along the line 4—4 of Figure 1, Figure 5 is a section along the line 5—5 of Figure 4, Figure 6 is a section along the line 6—6 of Figure 1, Figure 7 is a plan view of the agitator forming a part of the device, and Figure 8 is a top plan view of the drink-containing receptacle.

In carrying out my invention, I make use of a base member 1 having legs 2 for supporting the base upon a counter or the like.

An upright hollow bracket 3 is supported upon the base 1 and serves to support an electric motor 4 at the upper end thereof, having its shaft 5 extending vertically over the forward portion of the base 1.

The shaft 5 has an elongated portion 6 depending axially therefrom, which carries an agitator 7 of the saw-tooth type (see Figure 7). The direction of rotation of the agitator is that shown by the arrow 8 in Figure 7.

A vertical slideway, comprising a pair of spaced apart parallel slide members 9, is secured to the front wall of the bracket 3 by the provision of screws 10. A receptacle supporting member 11 is slidably mounted by means of slide members 12 in the slide members 9. The member 11 is shaped to receive a support and receptacle 13 having outwardly flared side walls, and is provided with a depending rotating finger at the upper end thereof for engaging with the peripheral edge of the receptacle to prevent the receptacle from tipping when upon the member 18.

In reference to Figure 8, it will be noted that the interior wall of the receptacle 13 is provided with spaced-apart helical ribs 15. These ribs are for the purpose of augmenting the agitation of liquid placed in the receptacle during the operation of the agitator 7. The peculiar disposition and structure of the ribs 15, I deem as one of the important features of my invention.

Means for permitting the member 11 to fall slowly when elevated to the position shown in Figure 2 and when supporting the receptacle 13, is provided in a vertical rod 16 which is connected at the upper end thereof by means of a member 17 to the upper end of the member 11.

The rod 16 has a plunger 18 at the lowermost end thereof, which is disposed within an air cylinder 19.

This air cylinder 19 is closed at its lowermost end by a threaded plug 20, and is supported at 21 to the base member 1.

From an inspection of Figure 6, it will be noted that the plug 21 has a tortuous passage 22 extending therethrough, and a needle valve 23 is projected within the passage, whereby the quantity of air passing through the passage 22 may be regulated by turning the lowermost exposed end 24 of the valve. Thus the speed at which the member 11, carrying the receptacle 13, is lowered by virtue of gravity will be accurately determined by operation of the needle valve as described.

A second passage 25 is provided through the plug 20, and has a valve seat 26 at the upper end thereof, which is normally closed by means of a ball 27 which seats thereupon. A lock spring 28 is disposed over the ball 27, but out of engagement therewith for preventing dislodgment of the ball when the device is laid upon its side or turned otherwise than from its normal upright position.

Means for permitting the member 11 to drop suddenly with the receptacle 13, when the receptacle has reached a predetermined position with respect to the agitator, is provided in a shoe having a pair of work-engaging portions 29 and 30, which shoe is carried by the lowermost of the members 12. The purpose in having two work-engaging portions 29 and 30 on the shoe is to adapt the device for use with two predetermined quantities of liquid within the receptacle, as in the case of a drink mixed for one person or a drink mixed for two persons.

The lever 31 having a forwardly extending portion 32 is pivotally supported at 33 to the bracket 3. The portion 32 of the lever is forced inwardly when the shoes 29 and 30 engage therewith. The opposite end of the lever 31 engages with a transversely extending portion 33ª of a rocker arm 34. The opposite end of the rocker arm 34, as shown at 35, carries an upwardly extending push rod 36 which rests just below the ball 27.

A compression spring 37 is disposed between the plug 20 and the portion 35 of the rocker arm. Thus when the lever 31 is actuated, as by engagement of the shoes 29 or 30 therewith, the rocker arm will move to force the push rod 36 upwardly against the force of the spring 37 to open the ball valve. This will permit an additional egress of air from the cylinder 29, and thereby cause the member 11 to be accelerated in its desired movement. The position of the shoes 29 and 30 is such as to actuate the ball valve when the levels of single and double drinks approach the agitator 7.

Means for closing the circuit, including the electric motor 4, when the member 11 is moved to the position shown in Figure 2, is provided in a quick acting switch of the ordinary type, which is indicated at 40. This switch has a rod 41 secured thereto which, when moved vertically in an upward direction, closes the switch, and which when moved downwardly, opens the switch. The rod 41 is connected by means of an insulating member 42 to a slidably mounted plate 43, which extends substantially throughout the height of the bracket 3. The member 42 is connected to the plate 43 by means of a connecting member 45.

The plate 43 has a slot 46 extending longitudinally therethrough, the upper end of which (see 47) is arranged for engagement with the upper edge of the member 17. Thus when the member 11 is elevated, the member 17 will engage with and elevate the plate 43 to close the switch 40. Current will thus flow through the switch from the supply source, indicated at 49, through the conductors 50 and 51 to the motor 4.

When the member 11 has reached the limit of its desired journey, the member 17 will engage with the lowermost edge 52 of the slot 46, so as to move the plate 45 downwardly and open the switch. This occurs after the valve 27 has been actuated to lower the receptacle with its liquid free of the agitator. The reason for this is to permit the agitator to operate for a longer time after it is free from contact with the liquid, so that it may free itself of the liquid by centrifugal force.

From the foregoing description of the various parts of the device, the operation thereof may be readily understood. The liquids, ice cream and the like, forming a part of the drink, are placed in the receptacle 13, and the receptacle is inserted with its upper peripheral edge beneath the finger 14, with its bottom wall upon the horizontal portion of the member 11. The entire member 11 with the cup 13 is then moved to the position shown in Figure 2, and to the top of the slideways 9.

At this time the member 17 will engage with the plate 42 to elevate the plate and close the switch 40. Current will then flow through the circuit to operate the motor 4, and the agitator 7 will be operated to agitate the liquids in the receptacle 13.

It should be noted at this time that the peculiar sawtooth structure of the agitator, together with the provision of the helical rigs 15, serves to thoroughly churn and mix the liquids and cream with one another.

The receptacle 13, by virtue of the weight of the liquids therein and of its own weight, together with the weight of the member 11, will slowly descend, and the piston 18 connected with the member 17 by means of the rod 16 will also lower. As the piston 18 lowers into the cylinder 19, limited quantities of air will be expelled through the passage 22 in the plug 20, the quantity of which is regulated by the adjustable needle valve 23.

This slow downward movement of the receptacle causes the agitator 17 to contact and mix every level of fluid in the receptacle from the bottom to a point adjacent to the top level.

As the agitator approaches the upper level of the liquid the shoe 29 will engage with the lever 31 at the point 32, so as to move the lever upon its pivotal support 33 to actuate the rocker arm 34. As the rocker arm 34 is actuated, the ball 27 will be elevated from its seat by virtue of the push rod 25 associated therewith and with the rocker arm, thereby permitting an additional quantity of air to be exhausted from the cylinder 19. This egress of additional quantities of air will permit a sudden acceleration in the downward movement of the receptacle 13, so as to quickly lower the liquid with its upper level out of contact with the agitator. The purpose of this sudden movement is to preclude the spattering of liquid as the agitator 7 contacts with the liquid at the surface.

It will be noted that the shoe is provided with two work engaging members 29 and 30. The member 30 will cause a similar acceleration in the downward movement of the receptacle 13, so that if a greater quantity of liquid than is normally disposed in the receptacle, as in the instance of a double drink, is placed therein, the liquid may be suddenly withdrawn from the agitator, as this higher level approaches a plane in which the agitator is disposed.

When the member 11 has been moved to the position shown in Figure 1, the member 17 will again engage with the plate 43 at the lowermost end 52 of the slot in the plate. This causes the plate to move downwardly so as to open the switch 40 and shut off the motor. There is a slight interval of time between the engagement of the work engaging portion 30 of the shoe with the lever 31, and the engagement of the member 17 with the lowermost part 52 of the slotted plate. The purpose of this time interval is to permit the agitator to free itself of liquid by virtue of centrifugal force.

I claim:

1. An automatic drink mixer of the character described, comprising a motor driven agitator, a receptacle for holding fluids, automatic means for moving the receptacle upon an axis parallel with the axis of the agitator, and means for accelerating the downward movement of the receptacle during its travel.

2. An automatic drink mixer of the character described comprising a power driven agitator, a liquid containing receptacle, a vertically slidable receptacle supporting member, and adjustable automatic means for moving said receptacle supporting member upon an axis parallel with the axis of the agitator.

3. An automatic drink mixer of the character described comprising a power driven agitator, a liquid containing receptacle, a vertically slidable receptacle supporting member, adjustable automatic means for moving said receptacle supporting member upon an axis parallel with the axis of the agitator, and other means associated with said receptacle supporting member for accelerating the downward movement of said supporting member during its travel.

4. An electric motor, including a circuit for operating the motor, and having a shaft, an agitator carried by said shaft, a liquid containing receptacle, a receptacle supporting member slidably mounted for travel upon an axis parallel with the axis of said motor shaft, and automatic means comprising a switch connected with said motor circuit for closing the circuit when the receptacle supporting member is at the uppermost end of its travel, and for opening the circuit when the supporting member reaches the lowermost end of its travel.

5. An electric motor, including a circuit for operating the motor, and having a shaft, an agitator carried by said shaft, a liquid containing receptacle, a receptacle supporting member slidably mounted for travel upon an axis parallel with the axis of said motor shaft, automatic means comprising a switch connected with said motor circuit for closing the circuit when the receptacle supporting member is at the uppermost end of its travel, and for opening the circuit when the supporting member reaches the lowermost end of its travel, and adjustable means for controlling the speed of the downward movement of said receptacle supporting member by virtue of the weight borne thereby.

6. In a device of the character described, a liquid containing receptacle, a receptacle supporting member mounted for movement upon a vertical axis, and compressed air means for resisting the downward movement of said receptacle supporting member, said means including an adjustable exhaust valve.

7. In a device of the character described, a liquid containing receptacle, a receptacle supporting member mounted for movement upon a vertical axis, compressed air means for resisting the downward movement of said receptacle supporting member, said means including an adjustable exhaust valve, and other means for increasing the exhaust of air from said compressed air resisting means when said receptacle supporting member has reached a predetermined point in its downward travel, said means comprising a normally closed valve and means arranged for engagement by said receptacle supporting member at a predetermined point in its travel, and connected at its opposite end with said normally closed valve, whereby the valve is opened upon engagement of the receptacle supporting member therewith.

JOHN ALAN HEARD.